(12) United States Patent
Hall et al.

(10) Patent No.: US 12,163,549 B2
(45) Date of Patent: Dec. 10, 2024

(54) HINGED RETAINER ASSEMBLY

(71) Applicant: Continental Automotive Systems, Inc., Auburn Hills, MI (US)

(72) Inventors: Scott Hall, Rochester Hills, MI (US); Blendi Sullaj, Groose Pointe Farms, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 1067 days.

(21) Appl. No.: 16/749,127

(22) Filed: Jan. 22, 2020

(65) Prior Publication Data
US 2021/0190123 A1 Jun. 24, 2021

Related U.S. Application Data

(60) Provisional application No. 62/952,904, filed on Dec. 23, 2019.

(51) Int. Cl.
*F16B 2/22* (2006.01)
*F16B 37/08* (2006.01)
*F16B 13/08* (2006.01)

(52) U.S. Cl.
CPC ............ *F16B 37/0878* (2013.01); *F16B 2/22* (2013.01); *F16B 13/0866* (2013.01)

(58) Field of Classification Search
CPC ............... F16B 37/0878; F16B 13/0866; F16B 41/002; F16B 2/22
USPC ............... 411/436, 437, 999, 499
See application file for complete search history.

(56) References Cited

U.S. PATENT DOCUMENTS

| | | | | |
|---|---|---|---|---|
| 3,776,579 | A * | 12/1973 | Gale | F16L 27/113 285/373 |
| 4,197,781 | A * | 4/1980 | Giannuzzi | F16B 13/061 411/341 |
| 4,802,804 | A | 2/1989 | Hirohata | |
| 5,031,268 | A | 7/1991 | McCabe | |
| 6,070,295 | A * | 6/2000 | Hulsebus | A47K 13/12 403/375 |
| 6,146,076 | A * | 11/2000 | Bodin | F16B 37/0828 211/187 |
| 6,264,413 | B1 | 7/2001 | Bisping et al. | |
| 7,258,519 | B2 * | 8/2007 | Shimizu | H02G 3/32 248/62 |
| 7,338,247 | B2 * | 3/2008 | Ateca | F16B 2/18 411/324 |

(Continued)

FOREIGN PATENT DOCUMENTS

| DE | 102004017449 | 10/2005 |
|---|---|---|
| DE | 102010004686 | 7/2011 |

(Continued)

OTHER PUBLICATIONS

PivotPoint Inc. Catalog 2015 Pins—Cables and Solutions. 52 pages.

(Continued)

*Primary Examiner* — William D Hutton, Jr.
*Assistant Examiner* — Dil K. Magar

(57) ABSTRACT

An assembly includes a clip portion which includes a first flexible flange and a second flexible flange that each at least partially define a central retainer passage. A flexible hinge connects the clip portion to a structure. A tab is located adjacent an opposite end of the clip portion from the flexible hinge.

13 Claims, 3 Drawing Sheets

(56) References Cited

U.S. PATENT DOCUMENTS

| | | | | |
|---|---|---|---|---|
| D576,029 S * | 9/2008 | Kato | ............................. | D8/397 |
| 7,946,781 B2 * | 5/2011 | Mudel | .................. | F16B 41/002 |
| | | | | 411/103 |
| 8,316,514 B2 | 11/2012 | Sano | | |
| 8,413,939 B2 * | 4/2013 | Ramsauer | ........... | F16B 37/0878 |
| | | | | 248/214 |
| 8,950,993 B2 * | 2/2015 | Gagne | .................... | F16B 37/08 |
| | | | | 411/433 |
| 10,030,692 B2 * | 7/2018 | Uhl | .......................... | F16C 7/06 |
| 10,240,625 B2 * | 3/2019 | Schneider | ............. | F16B 21/183 |
| 2005/0002757 A1 * | 1/2005 | Shimizu | .............. | F16B 37/0878 |
| | | | | 411/433 |
| 2009/0071093 A1 | 3/2009 | Hidajat et al. | | |
| 2009/0178247 A1 * | 7/2009 | Jalbert | ................ | F16B 19/1081 |
| | | | | 24/459 |
| 2009/0257822 A1 * | 10/2009 | Mudel | .................. | F16B 41/002 |
| | | | | 403/349 |
| 2010/0143066 A1 * | 6/2010 | Ramsauer | ........... | F16B 37/0878 |
| | | | | 411/116 |
| 2013/0037668 A1 * | 2/2013 | Benedetti | .................. | F16B 5/10 |
| | | | | 248/221.12 |
| 2014/0064880 A1 * | 3/2014 | Gensler | ................. | F16B 21/073 |
| | | | | 411/511 |
| 2014/0161562 A1 * | 6/2014 | Dechant | ................ | F16B 41/002 |
| | | | | 411/511 |
| 2017/0051780 A1 * | 2/2017 | Dickinson | ............. | F16B 21/076 |

FOREIGN PATENT DOCUMENTS

| | | | | |
|---|---|---|---|---|
| DE | 10205117536 | | 4/2017 | |
| DE | 102019215139 A1 * | | 4/2021 | ............ F16B 21/073 |
| EP | 0798474 | | 10/1997 | |
| EP | 0989310 | | 3/2000 | |
| EP | 1407933 A1 | | 4/2004 | |
| FR | 2898161 A1 | | 9/2007 | |
| GB | 2196404 | | 4/1988 | |
| JP | 2017078465 | | 4/2017 | |

OTHER PUBLICATIONS

International Search Report and Written Opinion dated Mar. 24, 2021 from corresponding International Patent Application No. PCT/US2020/066611.

Examination Report dated Jul. 22, 2024 from corresponding European patent application No. 20851360.6.

* cited by examiner

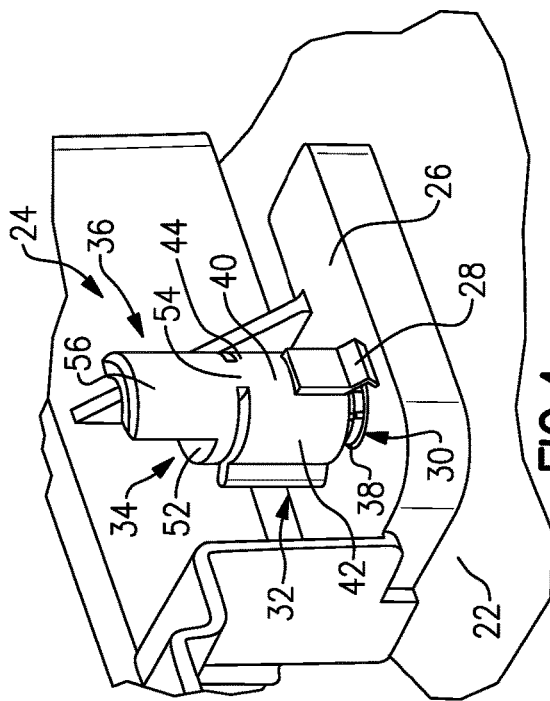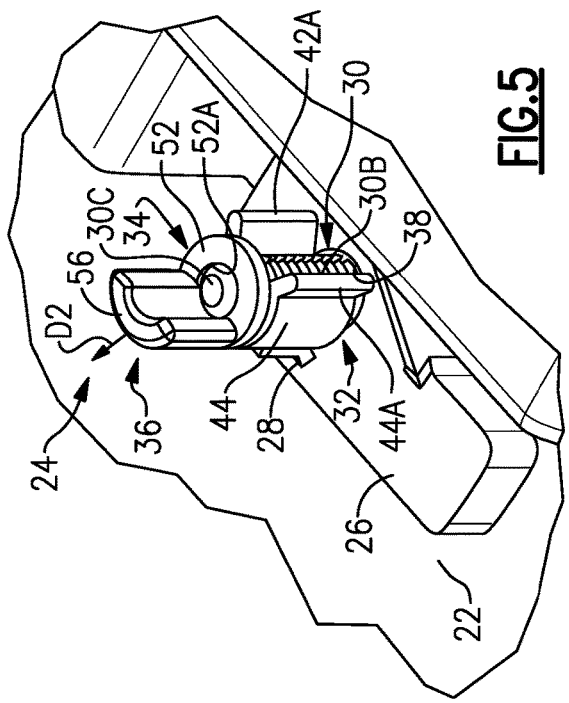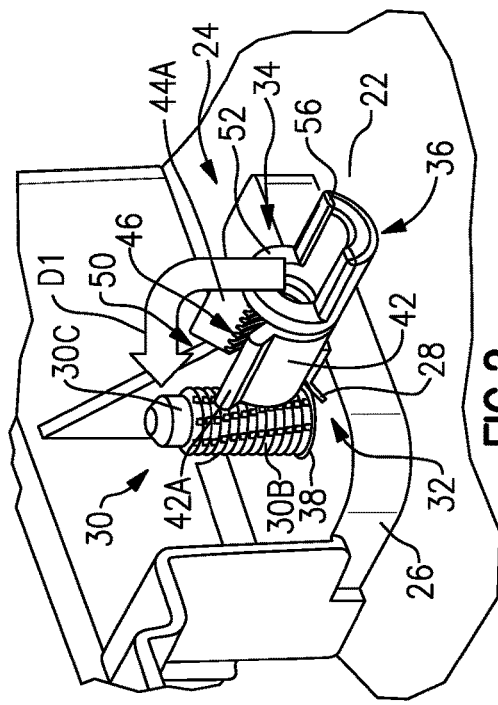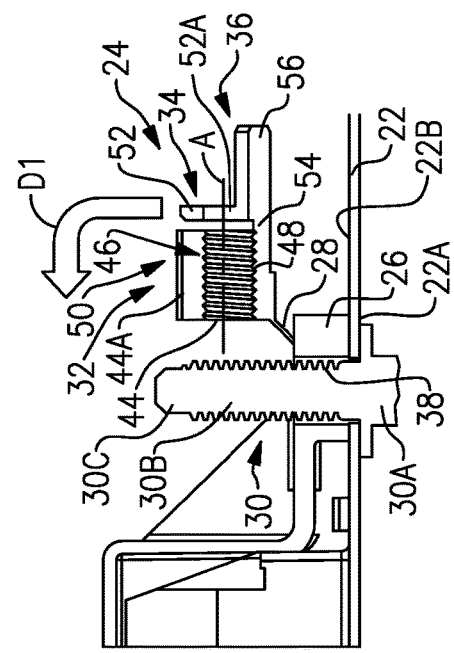

HINGED RETAINER ASSEMBLY

CROSS-REFERENCE TO RELATED APPLICATIONS

This application claims priority to U.S. Provisional Application No. 62/952,904, which was filed on Dec. 23, 2019 and is incorporated herein by reference.

BACKGROUND

The present disclosure relates to a retainer for securing a structure relative to a mounting surface.

Structures, such as housing for electronics or mechanical components have generally be secured using a threaded stud attached to a mounting surface that is accepted in a stud opening in the structure. A nut is then threaded onto the threaded stud to secure the structure to the mounting surface. However, overtime it is possible for the stud and/or nut to develop corrosion that could make separating the nut from the stud difficult. This is particularly true if the structure is used in an environment where it is subjected to salt exposure, such as on a vehicle.

SUMMARY

In one exemplary embodiment, an assembly includes a clip portion which includes a first flexible flange and a second flexible flange that each at least partially define a central retainer passage. A flexible hinge connects the clip portion to a structure. A tab is located adjacent an opposite end of the clip portion from the flexible hinge.

In a further embodiment of any of the above, the central retainer passage includes a contoured surface.

In a further embodiment of any of the above, the contoured surface defines a threaded surface.

In a further embodiment of any of the above, a first distal end of the first flexible flange and a second distal end of the second flexible flange each flair outward and away from the central retainer passage.

In a further embodiment of any of the above, a lock portion is located adjacent a second end of the central retainer passage opposite the flexible hinge located adjacent a first end of the central retainer passage.

In a further embodiment of any of the above, the lock portion includes a ring which has a central opening.

In a further embodiment of any of the above, the central opening of the ring is at least partially aligned with the central retainer passage.

In a further embodiment of any of the above, the ring includes a radially inner mounting stud contact surface.

In a further embodiment of any of the above, a neck segment surrounds less than 50% of the central retainer passage and connects the clip portion to the lock portion.

In a further embodiment of any of the above, the neck segment surrounds less than 25% of the central retainer passage.

In a further embodiment of any of the above, the neck portion flexibly connects the clip portion and the lock portion.

In a further embodiment of any of the above, the clip, the flexible hinge, and the structure are a single piece unitary component.

In a further embodiment of any of the above, the structure includes a flange which has a stud opening.

In a further embodiment of any of the above, a mounting stud extends through the stud opening and is located in the central retainer passage and is in engagement with the first flexible flange and the second flexible flange.

In another exemplary embodiment, a method of retaining a structure relative to a mounting surface includes locating a structure relative to a mounting surface with a mounting stud fixed relative to the mounting surface and extending through a stud opening on a flange of the structure. A retainer assembly is moved about a flexible hinge connected to the structure. The mounting stud is engaged with a first flexible flange and a second flexible flange on the retainer assembly.

In a further embodiment of any of the above, a distal end of the mounting stud is engaged with a lock portion of the retainer assembly.

In a further embodiment of any of the above, the first and second flexible flanges are located on a clip portion. The lock portion is connected to the clip portion by a neck segment.

In a further embodiment of any of the above, a tab is located on an opposite side of the lock portion from the first and second flexible flanges.

In a further embodiment of any of the above, the lock portion includes a lock ring which has an inner surface for engaging the mounting stud.

In a further embodiment of any of the above, the retainer assembly, the flexible hinge, and the structure are a single piece unitary component.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 2 is a perspective view of the retainer assembly of FIG. 1 in a disengaged configuration.

FIG. 3 is a cross-sectional view taken along line 3-3 of FIG. 2.

FIG. 4 is a perspective view of the retainer assembly in an engaged configuration.

FIG. 5 is another perspective view of the retainer assembly in an engaged configuration.

DETAILED DESCRIPTION

Figure 1:
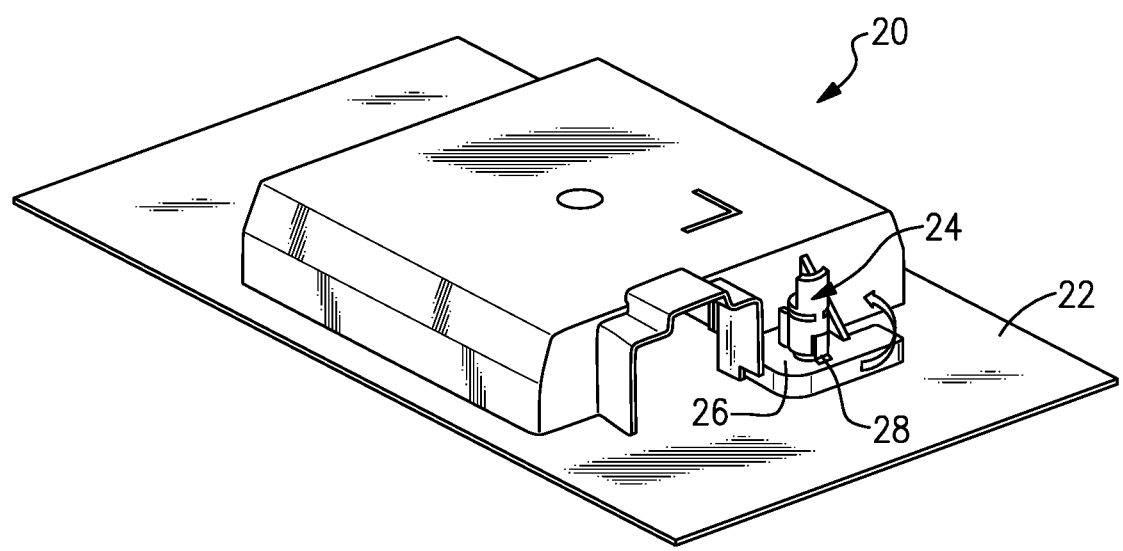
FIG. 1 illustrates an example structure attached to a mounting surface with at least one retainer assembly.

FIG. 1 illustrates an example structure 20 attached to a mounting surface 22. In the illustrated example, the structure 20 fits flush against the mounting surface 22 and is fixed relative to the mounting surface 22 with a retainer assembly 24. The retainer assembly 24 is attached to a flange 26 on the structure 20 with a hinge 28, such as a flexible hinge. However, the retainer assembly 24 could be attached to a separate portion of the structure 20, such as a central portion of the structure 20. The structure 20 could include a housing, such as a housing for an electronic device, a mechanical device, or any other type of structure that is attachable to the mounting surface 22. In the illustrated example, the mounting surface 22 is a piece of sheet metal. However, the mounting surface 22 could include another type of surface or structure.

As shown in FIGS. 2-4, the retainer assembly 24 includes a clip portion 32, a lock portion 34, and a distal portion 36. In the illustrated example, the retainer assembly 24 is a single unitary piece of material with the structure 20. For example, the retainer assembly 24 and the hinge 28 could be cast or injection molded together with the structure 20. Alternatively, the retainer assembly 24 could be separately formed from the hinge 28 and the flange 26 and attached by a welding process or an adhesive. One feature of this configuration is a reduced number of components that can be separated and lost during assembly or disassembly of the structure 20 relative to the mounting surface 22. Additionally, because the pieces are a single piece, the hinge 28 flexes or elastically deforms to allow for movement of the retainer assembly 24 instead of having multiple components that pivot. Also, the retainer assembly 24 reduces the need for costly installation equipment during assembly and reduces the total number of parts needed to inventory related to the structure 20.

The retainer assembly 24 is pivotable relative to the flange 26 such that the retainer assembly 24 can move into and out of engagement with a mounting stud 30. In the illustrated example, the mounting stud 30 includes a head portion 30A in engagement with a first side 22A of the mounting surface 22, a threaded shaft portion 30B extending from the head portion 30A, and an unthreaded distal end shaft portion 30C distal of the threaded shaft portion 30B. The structure 20 is located on a second side 22B of the mounting surface 22 opposite the first side 22A.

The mounting stud 30 extends through a stud opening 38 in the flange 26 on the structure 20 with the stud opening 38 being adjacent to the retainer assembly 24 and the hinge 28. One feature of utilizing the retainer assembly 24 in place of a traditional nut on the mounting stud 30 is a reduction in corrosion that can result over time between the mounting stud 30 and the nut making separating the two components more difficult when servicing or repairing the structure 20.

The clip portion 32 of the retainer assembly 24 includes a body portion 40 having a first flexible flange 42 and a second flexible flange 44 at least partially defining a central retainer passage 46. The central retainer passage 46 is generally cylindrical and can be of a smaller diameter than the mounting stud 30 when in an uninstalled position. A first distal end of the first flexible flange 42 and a second distal end of the second flexible flange 44 includes a first flared portion 42A and a second flared portion 44A, respectively. The first and second flared portions 42A, 44A extend outward and away from the central retainer passage 46. The first and second flared portions 42A and 44A, help to guide the mounting stud 30 towards the central retainer passage 46.

As the retainer assembly 24 is being pivoted from a disengaged position (FIGS. 2 and 3), into an engaged position (FIGS. 4 and 5), the first and second flexible flanges 42, 44 expand outward to increase a diameter of the central retainer passage 46 to allow the mounting stud 30 to pass through a stud opening 50 defined between the first and second flexible flanges 42, 44. In the illustrated example, the stud opening 50 extends a length of the central retainer passage 46 between opposing longitudinal ends the first and second flexible flanges 42, 44.

An inner surface of the central retainer passage 46 defined by the first and second flexible flanges 42, 44, includes a contoured surface 48, such as a threaded or ribbed surface. Because the first and second flexible flanges 42 and 44 only extend partially around the central retainer passage 46 to allow the stud opening 50 to accept the mounting stud 30, the contoured surface 48 is segmented. Additionally, in the illustrated example, the contoured surface 48 does not extend onto the first or second flared portions 42A, 44A.

The lock portion 34 is located on an opposite axial end of the clip portion 32 from the hinge 28. In this disclosure, axial or axially, radial or radially, and longitudinal or longitudinally is relative to a longitudinal axis A (FIG. 3) of the central retainer passage 46 unless stated otherwise. The lock portion 34 includes a ring 52 having a central opening that is coaxial with the central retainer passage 46. An inner surface 52A of the ring is configured to contact the unthreaded distal end shaft portion 30C of the mounting stud 30. A neck portion 54 connects the clip portion 32 to the lock portion 34. The neck portion 54 allows the lock portion 34 to flex relative to the clip portion 32. In the illustrated example, the neck portion 54 extends less than 50% around the central retainer passage 46 and in another example, the neck portion 54 extends less than 25% around the central retainer passage 46.

The ability of the lock portion 34 to flex relative to the clip portion 32 allows the ring 52 to be located around the unthreaded distal end shaft portion 30C of the mounting stud 30. The ring 52 provides a locking function in addition to the compressive force from the first and second flexible flanges 42, 44.

The distal portion 36 includes a tab 56 fixed relative to the lock portion 34. The tab 56 provides leverage to disengage the lock portion 34 from unthreaded distal end shaft portion 30C of the mounting stud 30. For example, applying force in the direction D2 to the tab 56 deflects the lock portion 34 relative to the clip portion 32 to move the ring 52 off of the unthreaded distal end shaft portion 30C of the mounting stud 30. Once the ring 52 has been moved off of the unthreaded distal end shaft portion 30C of the mounting stud 30, the first and second flexible flanges 42, 44 can be released from the mounting stud 30 with the application of additional force. In the illustrated example, the tab 56 includes a recess forming a groove at least partially aligned with the longitudinal axis A of the central retainer passage 46.

Figure 6:
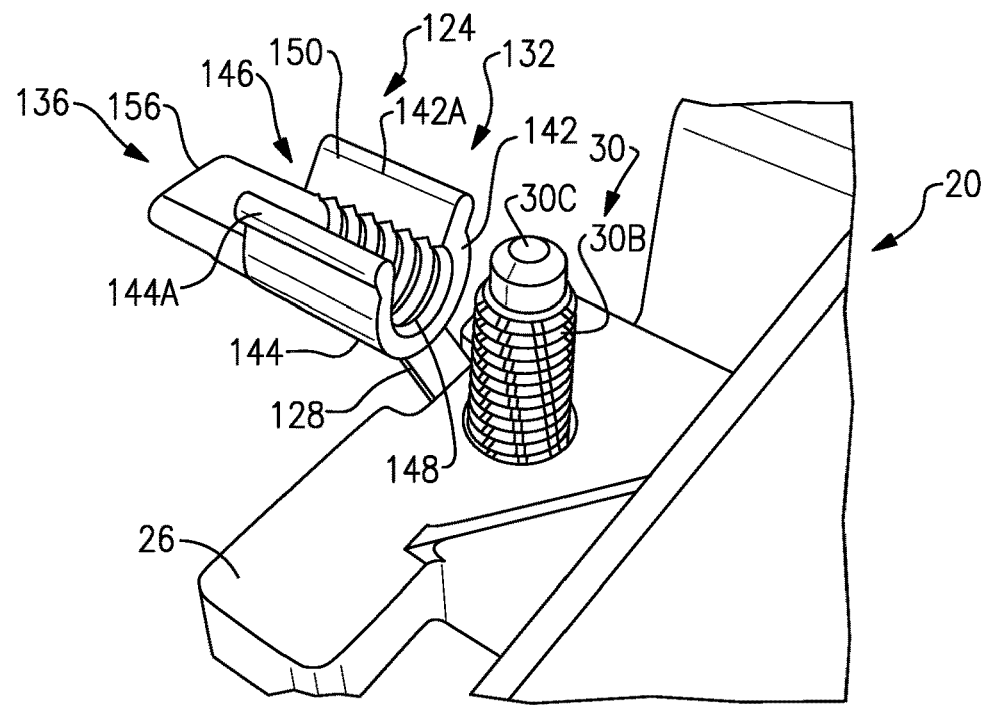
FIG. 6 is a perspective view of another example retainer assembly in a disengaged configuration.
Figure 7:
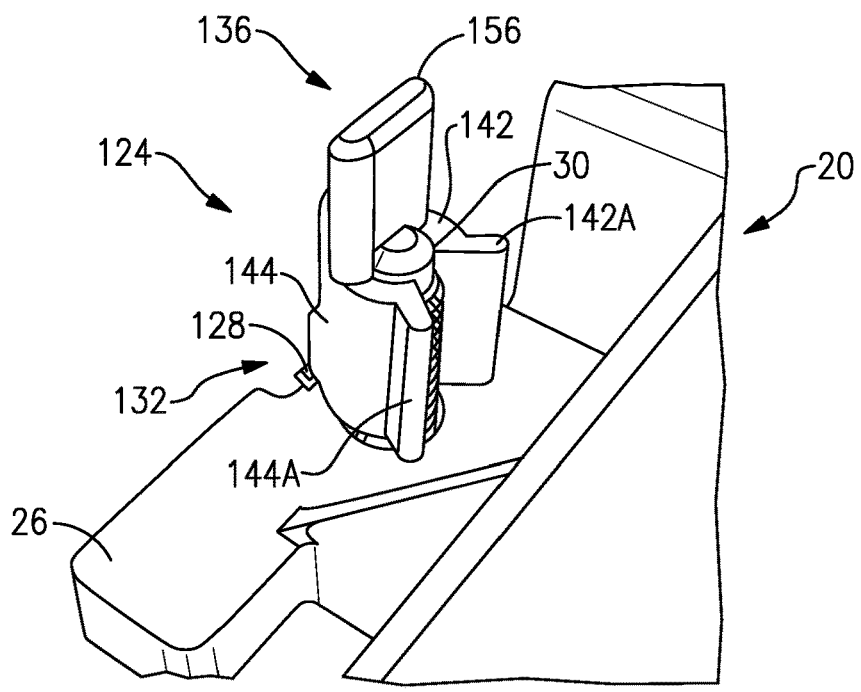
FIG. 7 is a perspective view of the retainer assembly of FIG. 6 is an engaged configuration.

FIGS. 6 and 7 illustrate another example retainer assembly 124 similar to the retainer assembly 24 except where described below or shown in the Figures. The retainer assembly 124 includes a clip portion 132 and a distal portion 136. The retainer assembly 124 does not include the lock portion 34 as with the retainer assembly 24.

The retainer assembly 124 is pivotable relative to the flange 26 with a hinge 128 such that the retainer assembly 124 can move into and out of engagement with the mounting stud 30. The clip portion 132 of the retainer assembly 124 includes a body portion 140 having a first flexible flange 142 and a second flexible flange 144 at least partially defining a central retainer passage 146. A first distal end of the first flexible flange 142 and a second distal end of the second flexible flange 144 includes a first flared portion 142A and a second flared portion 144A, respectively. The first and second flared portions 142A, 144A extend outward and away from the central retainer passage 146. The first and second flared portions 142A and 144A, help to guide the mounting stud 30 towards the central retainer passage 146.

As the retainer assembly 124 is being pivoted from a disengaged position (FIG. 6), into an engaged position (FIG. 7), the first and second flexible flanges 142, 144 expand outward to increase a diameter of the central retainer passage 146 to allow the mounting stud 30 to pass through a stud opening 150 defined between the first and second flexible flanges 142, 144. In the illustrated example, the stub opening 150 extends a length of the central retainer passage 146 between the first and second flexible flanges 142, 144.

An inner surface of the central retainer passage 146 defined by the first and second flexible flanges 142, 144, includes a contoured surface 148, such as a threaded or ribbed surface. Because the first and second flexible flanges 142 and 144 only extend partially around the central retainer passage 146 to allow the stud opening 150 to accept the mounting stud 30, the contoured surface 148 is segmented. Additionally, the contoured surface 148 does not extend onto the first or second flared portions 142A, 144A.

The distal portion 136 includes a tab 156 fixed relative to the clip portion 32. The tab 156 provides leverage to disengage the first and second flexible flanges 142, 144 from the mounting stud 30. For example, apply force in the direction D2 to the tab 156 deflects the first and second flexible flanges 142, 144 of the clip portion 32 to allow the mounting stud 30 to pass through the stud opening 150 and release the structure 120 from the mounting stud 30.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. An assembly comprising:
    a clip portion including a first flexible flange and a second flexible flange that each at least partially define a central retainer passage and define a stud opening between the first and second flexible flanges;
    a flexible hinge connecting the clip portion to a structure;
    a tab located adjacent an opposite end of the clip portion from the flexible hinge; and
    a lock portion located adjacent a second end of the central retainer passage opposite the flexible hinge located adjacent a first end of the central retainer passage, wherein the lock portion includes a ring having a central opening;
    the first and second flexible flanges configured to expand outwardly to increase a diameter of the central retainer passage so as to allow a mounting stud to pass through the stud opening transversely as the assembly is being pivoted about the flexible hinge from a disengaged position into an engaged position.

2. The assembly of claim 1, wherein the central retainer passage includes a contoured surface.

3. The assembly of claim 2, wherein the contoured surface defines a threaded surface.

4. The assembly of claim 1, wherein a first distal end of the first flexible flange and a second distal end of the second flexible flange each flair outward and away from the central retainer passage.

5. The assembly of claim 1, wherein the central opening of the ring is at least partially aligned with the central retainer passage.

6. The assembly of claim 1, wherein the ring includes a radially inner mounting stud contact surface.

7. The assembly of claim 1, including a neck segment surrounding less than 50% of the central retainer passage and connecting the clip portion to the lock portion.

8. The assembly of claim 7, wherein the neck segment surrounds less than 25% of the central retainer passage.

9. The assembly of claim 7, wherein the neck segment flexibly connects the clip portion and the lock portion.

10. The assembly of claim 1, wherein the clip, the flexible hinge, and the structure are a single piece unitary component.

11. The assembly of claim 10, wherein the structure includes a flange having a stud opening.

12. The assembly of claim 11, including a mounting stud extending through the stud opening and located in the central retainer passage and in engagement with the first flexible flange and the second flexible flange.

13. The assembly of claim 1, wherein the stud opening extends throughout a length of the central retainer passage between the first and second flexible flanges.

* * * * *